June 10, 1969   J. W. MYERS   3,449,264
ISOMERIZATION CATALYSTS AND THEIR USE
Filed Nov. 27, 1961
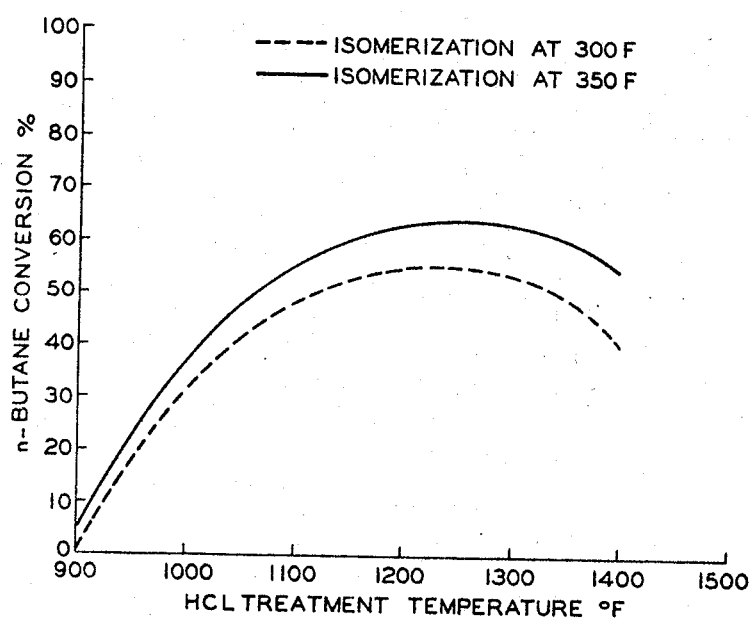
INVENTOR.
J. W. MYERS
BY *Hudson & Young*
ATTORNEYS United States Patent Office 3,449,264
Patented June 10, 1969

3,449,264
ISOMERIZATION CATALYSTS AND THEIR USE
John W. Myers, Bartlesville, Okla., assignor to Phillips Petroleum Company, a corporation of Delaware
Continuation-in-part of applications Ser. No. 38,487, June 24 1960, and Ser. No. 119,277, June 26, 1961. This application Nov. 27, 1961, Ser. No. 157,298
Int. Cl. B01j *11/16, 11/64;* C07c *5/24*
U.S. Cl. 252—441                                    13 Claims This is a continuation-in-part of my applications S.N. 38,487 filed June 24, 1960, and S.N. 119,277 filed June 26, 1961, both now abandoned.

This invention relates to a process for improving the activity of alumina and platinum-alumina catalysts to increase their capacities for isomerizing and hydrocracking hydrocarbons, and to the isomerization and hydrocracking of hydrocarbons utilizing the improved catalysts.

In recent years, the compression ratio of automobile engines has been raised to a level such that motor fuels or relatively high octane rating have become necessary. In fact, present-day automotive fuels are almost comparable in octane number to aviation gasolines of ten years ago. As a consequence of this rise in octane number, many new processes have been introduced in refineries for the production of such high grade fuels, and include, for example, alkylation, catalytic reforming, catalytic cracking, and the like. In connection with such processes, particularly alkylation, a source of isoparaffins is necessary. Thus, it has become necessary to provide new processes for the production if isoparaffins, since natural sources of these materials are not nearly sufficient to supply present-day needs. The most widely used method for the preparation of isoparaffins comprises isomerization of normal paraffins. Hydrocracking of heavier hydrocarbons to produce lighter hydrocarbons is also practiced by the petroleum industry.

The most widely used isomerization catalysts are Friedel-Crafts catalysts, of which the preferred one is aluminum chloride. However, other catalysts have been developed and are used in certain instances.

The isomerization of hydrocarbons over platinum-on-alumina, promoted with noble metals, has been practiced. The halogens, chlorine and fluorine, have been added in minor amounts to these catalysts to enhance the activity thereof for isomerization processes. The temperatures utilized in the isomerization of hydrocarbons with the aforesaid catalyst have been above 600° F., e.g., in the range of 600–900° F. The present invention is concerned with a process for activating alumina and platinum-alumina type catalysts, which may also contain aluminum chloride and/or halogen, so as to make it possible to isomerize hydrocarbons with high efficiency and high yield at temperatures well below conventional isomerization temperatures, i.e., below about 600° F.

Accordingly, the principal object of the invention is to provide a process for the preparation and activation of alumina, platinum-alumina, and alumina-platinum metal-aluminum chloride catalysts whereby the catalysts have excellent isomerization activity at temperatures below 600° F. Another object is to provide a process for isomerizing hydrocarbons with these catalysts, activated in accordance with the invention, operable at relatively low temperatures, such as below 600° F. A further object is to provide a process for isomerizing normal paraffins and naphthenes, which is more economical than conventional processes. An additional object is to provide an improved process for hydrocracking hydrocarbons. Other objects of the invention will become apparent to one skilled in the art upon consideration of the accompanying disclosure.

A broad aspect of the invention comprises treating active alumina-containing catalysts with at least one treating agent selected from the group consisting of Cl, HCl, Br, HBr, mono-, di-, tri- and tetrachloromethane, and mono-, di-, tri-, and tetrabromomethane, in the range of 400 to 1500° F. so as to activate the catalyst. Anhydrous HCl and HBr must be used. The activation process of the present invention is carried out by heating the active alumina, platinum metal-alumina, or platinum metal-halogen-alumina catalyst at a temperature of 400° to 1500° F., preferably 1050° F. to 1400° F., for a period of at least 10 minutes and up to 100 hours or more, preferably ½ to 6 hours, at least 10 minutes, preferably, ½ hour of heating being in the range of 900 to 1500° F. and at least 10 minutes, preferably, ½ hour being in contact with the treating agent. The treating agent may be used, alone, or it may be carried in a stream of carrier gas such as nitrogen, methane, ethane, or other gas essentially inert in the treating process. The treating agent may comprise 1 to 100 percent of the treating gas stream. The activating gas pressure is not critical, but is usually about atmospheric or a convenient higher pressure. The treatment is preferably carried out in a muffle furnace or equivalent apparatus at a temperature in the prescribed range.

By drying the catalyst at a temperature in the range of 900 to 1500° F. for at least ½ hour in a dry ambient, the temperature of treatment with the treating gas may be as low as about 400° F. Also, the drying and treating may be effected in one step at temperatures in the range of 900 to 1500° F., preferably 1200 to 1500° F. for at least 0.5 hour.

The catalysts to be activated by this process comprise essentially alumina and platinum supported on an active alumina base. These catalysts are well known in the prior art, along with numerous ways of preparing them. The platinum-alumina catalyst contains from 0.01 to 10, preferably from 0.1 to 1, weight percent platinum on the alumina base. These catalysts can also contain a minor amount of halogen incorporated during preparation of the catalyst, chlorine and/or fluorine being the two halogens commonly present. Although one or both of these halogens can be present in the catalyst prior to activation by the process of the present invention, the catalyst containing them is not the equivalent of the catalyst which has been activated by the present process with or without these halogens. The amount of halogen in the catalyst is usually less than about 1.5 weight percent of the catalyst.

To produce these catalysts, an alumina, well known in the art as an "active" alumina, is essential. Active aluminas may be synthetically prepared as by calcination of alumina gels which re formed by adding such reagents as ammonium hydroxide to a salt of alumina, such as aluminium chloride or aluminum nitrite. These aluminas are generally termed gamma or eta aluminas. Similar active aluminas may be prepared by calcination of naturlly occurring aluminas such as the monohydrate and the trihydrate. Bauxite is a common source of active alumina when properly calcined and dehydrated. The alumina base of the catalyst may contain minor amounts of silica and boria. The amounts of these materials should be less than about 30% and, preferably, less than about 10% to produce the most active catalysts.

The foregoing and subsequently disclosed catalysts of the present invention are particularly applicable to the isomerization of isomerizable hydrocarbons, including aromatics (acyclic paraffins, and naphthenes. These catalysts are particularly suitable for this isomerization of straight chain paraffins containing four or more carbon atoms per molecule including n-butane, n-pentane, n-heptane and the like. Some examples of naphthenes which can be isomerized with these catalysts are methylcyclopentane, dimethylcyclopentane, cyclohexane, methylcyclohexane and the like. The preferred feeds are $C_4$–$C_{10}$ normal paraffins and $C_6$–$C_{10}$ naphthenes. They can be employed for the isomerization of mixtures of paraffins and naphthenes such as are obtained from the distillation of straight run or natural gasolines.

In utilizing the catalysts of this invention for the isomerization of foregoing hydrocarbons, the hydrocarbons to be isomerized are contacted with these new catalysts at a temperature in the range of 200 to 600° F., preferably 250 to 450° F., in the presence of free hydrogen. The hydrogen-hydrocarbon mol ratios used during isomerization are within the range of 0.25 to 10.0, although it is not essential to use hydrogen, while liquid hourly space velocities of from 0.25 to 10.0 are very satisfactory. Pressures in the isomerization zone will be within the range of 50 to 1500 p.s.i.g. It is to be understood that the catalysts of this invention of lower activity, that is, those which were treated with the treating agents at a temperature in the lower part of the temperature range, will be utilized at higher isomerization temperatures than those of higher activity and vice versa.

Maintenance of catalyst activity during use in the isomerization process is aided by inclusion of 0.001 to about 1 weight percent chloride in the feed in the form of chlorinated hydrocarbons such as carbon tetrachloride, chloroform, ethyl chloride, isopropyl chloride, etc. This is not a substitute for the activation of the present invention, but aids in maintaining over longer process periods the high level of catalyst activity produced by the present invention.

In utilizing the catalysts of this invention for hydrocarbon isomerization, the isomerization can be carried out either batchwise or continuous, preferably the latter. In carrying out the process as a continuous one, it is to be understood that hydrogen in the effluent product can be separated and recycled, and that recycling of isomerization promoters such as hydrogen chloride (introduced via feed) can be employed.

The following specific examples are intended to illustrate the advantages of the previously described catalysts of this invention, but it is not intended that the invention be unduly limited thereby.

EXAMPLE I

Two runs were carried out in which an alumina catalyst which had been treated with anhydrous hydrogen chloride at high temperature was employed for the isomerization of n-butane.

In each of these runs, the catalyst was prepared by heating a dried active alumina to 1200° F. in a muffle furnace and passing prepurified nitrogen over the catalyst for 1.3 hours. At the end of this time, a stream of anhydrous hydrogen chloride was introduced into the nitrogen line, and the resulting stream of mixed nitrogen and anhydrous hydrogen chloride was passed over the catalyst for 6.8 hours.

The above-prepared catalyst was then employed for the isomerization of n-butane, one run being carried out at approximately 300° F., and the other at approximately 350° F.

As shown in Table I, high conversion of n-butane and high isomerization efficiencies were obtained with this inexpensive isomerization catalyst.

TABLE I

| | Run number | |
|---|---|---|
| | 1 | 2 |
| Isomerization conditions: | | |
| Temperature, ° F. | 303 | 347 |
| Pressure, p.s.i.g. | 500 | 500 |
| Liquid hourly space velocity | 1.1 | 1.1 |
| $H_2$/hydrocarbon mol ratio | 0.5 | 0.5 |
| Isomerization results: | | |
| n-Butane conversion, percent | 63.2 | 64.4 |
| Isomerization efficiency, mol percent | 98.4 | 94.2 |

Another catalyst of the invention comprises an active alumina having deposited thereon a platinum metal in an amount in the range of 0.01 to 3 weight percent, based on the weight of the alumina, and which has been contacted with a member of the group consisting of anhydrous HCl, Cl, HBr, Br and the Cl and Br substituted derivatives of methane, at a temperature in the range of 900 to 1500° F., preferably 1050 to 1400° F., for a period in the range of 0.2 to 24 hours so as to incorporate treating agent in the alumina. The platinum-group metals include Pt, Pd, Ru, Rh, Os, and Ir. Of these metals, platinum is the most effective and palladium is more effective than the remainder of the group. The alumina base may contain silica and boria as indicated in connection with the first disclosed catalyst. It is also feasible to treat the supported platinum-group metal with the treating agent at a low temperature and subsequently elevate the temperature to the aforesaid range. This latter method is not as effective in that it does not produce as active a catalyst as the catalyst activated by first contacting it with the treating agent at the disclosed elevated temperature.

The method of activating the catalyst and the isomerization conditions are the same as for the first described catalyst.

EXAMPLE II

A number of runs were carried out in which a platinum on alumina catalyst was treated with anhydrous hydrogen chloride according to the method of this invention.

In each of these runs, a platinum on active alumina catalyst containing 0.7 weight percent Pt, 0.3 weight percent Cl, and 0.5 weight percent F was placed in a muffle furnace at the desired temperature with prepurified $N_2$ passing over the catalyst. After a finite length of time, anhydrous HCl was introduced into the $N_2$ stream.

After these catalyst had been treated for the desired length of time, they were removed and utilized for the isomerization of n-butane. The results of these runs are expressed at Table II.

In the isomerization runs, n-butane was isomerized at either 300 or 350° F. (±7° F.) at a $H_2$/HC mol ratio of 0.6, a liquid hourly space velocity (LHSV) of 1.0; and a pressure of 500 p.s.i.g.

TABLE II

| Run No. | Temp., ° F. | $N_2$ treating time, hrs. | $N_2$-HCl* treating time, hrs. | Temp. ° F. | n-Butane conversion, percent | Isomerization efficiency mol. Percent |
|---|---|---|---|---|---|---|
| 1A | 900 | 1.3 | 5.4 | 300 | 1.9 | |
| 1B | 900 | 1.3 | 5.4 | 350 | 4.9 | |
| 2A | 1,050 | 1.7 | 5.9 | 300 | 16.1 | |
| 2B | 1,050 | 1.7 | 5.9 | 350 | 49.5 | |
| 3A | 1,200 | 1.9 | 4.6 | 300 | 55.7 | 98.5 |
| 3B | 1,200 | 1.9 | 4.6 | 350 | 61.3 | 96.0 |
| 4A | 1,300 | 1.0 | 6.0 | 300 | 54.3 | |
| 4B | 1,300 | 1.0 | 6.0 | 350 | 62.2 | |
| 5A | 1,400 | 1.2 | 5.7 | 300 | 40.9 | |
| 5B | 1,400 | 1.2 | 5.7 | 350 | 55.0 | |

*Catalysts were cooled in HCl ambient.

The drawing comprises a graph showing a plot of the conversions versus the catalyst treatment temperature in the above runs. The two curves on the graph are for the two different isomerization temperatures, 300° F. and 350° F. It can be seen that a maximum conversion of n-butane is obtained at an HCl treatment temperature in the range 1200–1300° F.

Another catalyst of the invention comprises active alumina having deposited thereon a platinum metal, the resulting composite being contacted with the selected treating agent at a temperature in the range of 900 to 1500° F., preferably 1050 to 1400° F., for a period in the range of 0.2 to 24 hours, and having sublimed thereon, after the contacting, $AlCl_3$ while at a temperature in the range of 375 to 660° F. The contacting with the treating agent is the same as for the previously described catalyst. The alumina base and the isomerization conditions are also the same. The amount of $AlCl_3$ is usually in the range of 1 to 15 weight percent of the composite treated.

The aluminum chloride treatment of the catalyst is effected by subliming aluminum chloride onto the activated, chlorine-containing, alumina-platinum metal composite at a temperature in the range fo 375 to 660° F. Following the sublimation of aluminum chloride onto the composite, the resulting composite, comprising aluminum chloride on a supported platinum-group metal catalyst is heated to a temperature within the range between 900 and 1500 F., preferably between 1050 and 1400 F. The time for this treatment is in the range of 0.5 to 24 hours, with the longer times being utilized with the lower temperatures and vice versa. The high temperature treatment of the aluminum chloride-containing catalyst does not drive off all of the aluminum chloride, even though the temperature of the heat treatment is far above the sublimation temperature of aluminum chloride (352° F.).

A convenient method for carrying out the heat treating step of this invention is to pass a stream of nitrogen and/or hydrogen over the aluminum chloride-containing supported platinum-group metal catalyst while maintaining the catalyst at a temperature within the above-described range. Normally, because of the temperatures being utilized, such treatment is carried out in a muffle furnace or similar piece of heating equipment.

EXAMPLE III

Several runs were carried out in which platinum on alumina catalysts were treated according to the method of this invention wherein said catalysts were first treated with anhydrous HCl, after which aluminum chloride was sublimed onto the catalysts. Each of these catalysts was dried for 2 to 3 hours at about 900° F. with nitrogen passing over the catalyst. The catalyst was then cooled to the desired temperature, anhydrous HCl was mixed with the nitrogen and the mixed stream was passed over the catalyst for 2 to 3 hours.

After the HCl treatment, approximately 10 weight percent of $AlCl_3$, based on the catalyst, was sublimed onto the catalyst. The catalysts were then cooled to room temperature and employed for the isomerization of n-butane. The results of these tests are expressed below as Table III.

TABLE III

| | Run number | | |
|---|---|---|---|
| | 1[1] | 2[2] | 3[2] |
| Catalyst preparation: | | | |
| HCl treatment temperature, ° F | 400 | 400 | [3]400–900 |
| Isomerization: | | | |
| Temperature, ° F | 351 | 395 | 400 |
| Pressure, p.s.i.g | 500 | 500 | 500 |
| LHSV | 1.1 | 1.2 | 0.9 |
| $H_2$/hydrocarbon mol ratio | 0.4 | 0.6 | 0.4 |
| n-Butane conversion, percent | 38.5 | 27.8 | 48.2 |
| Isomerization efficiency, mol percent | 96.9 | 99.0 | 98.0 |

[1] The supported platinum catalyst used in this run was prepared by impregnating alumina with a solution of chloroplatinic acid in 2.6 wt. percent aqueous HCl. After drying and calcining, the final catalyst containing approximately 0.3 wt. percent Pt.
[2] The catalyst used in these runs contained approximately 0.7 wt. percent Pt, 0.3 wt. percent Cl and 0.5 wt. percent F and was treated with 2.6 wt. percent aqueous HCl.
[3] Catalyst was treated at 400° F and then 900° F.

In the above table, Runs 1 and 2 are control runs, while Run 3 represents the method of the invention. It can be seen that the 900° F. HCl treatment produced a much superior catalyst to the catalyst subjected to 400° F. treatment, as evidenced by the large increase in butane conversion.

EXAMPLE IV

Still another series of runs were carried out in which supported platinum catalysts were treated with HCl, after which $AlCl_3$ was sublimed onto the catalysts. In addition, in these runs, an additional heat treatment after the aluminum chloride sublimation was employed.

In these runs, a platinum on alumina catalyst conploying a $N_2$ stream and then a $N_2$-HCl mixture as in tained 0.7% by wt. Pt, 0.3% by wt. Cl and 0.5% by wt. F. was treated at high temperature with HCl by em- Example I. Following this treatment, $AlCl_3$ was sublimed onto the catalysts at 400° F., after which the resulting composite was heated to a high temperature. The catalysts were then employed for the isomerization of n-butane. The results of these runs are expressed below as Table IV.

TABLE IV

| | Run number | | |
|---|---|---|---|
| | 4 | 5 | 6 |
| Catalyst preparation: | | | |
| HCl treatment temperature, ° F | 900 | 1,000 | 1,000 |
| Treating temperature after $AlCl_3$ sublimation, ° F | 900 | 1,000 | 1,200 |
| Isomerization: | | | |
| Temperature, ° F | 350 | 351 | 350 |
| Pressure, p.s.i.g | 500 | 500 | 500 |
| LHSV | 0.9 | 1.0 | 0.9 |
| $H_2$/hydrocarbon, mol ratio | 0.5 | 0.6 | 0.5 |
| n-Butane conversion, percent | 57.8 | 61.9 | 63.3 |
| Isomerization efficiency, mol percent | 98.7 | 96.0 | 94.0 |

By comparing Runs 4, 5 and 6 with Run 3 of Example III, it can be seen that the final heating step increases the conversion considerably. Furthermore, this conversion is also higher when higher temperatures are employed in the final heating step.

EXAMPLE V

Platinum-halogen-alumina catalyst inactive for the isomerization of normal butane at temperatures below 400° F. was treated with chlorine for about 5¼ hours at 1200° F. After this treatment, the catalyst gave about 17 percent isomerization of normal butane at 350° F.

Example V illustrates the effectiveness of chlorine and chlorine-containing gases in effecting an improvement in the catalyst. Chlorine and chlorine-containing gases ($Cl_2+N_2$) may be advantageously used alone or in conjunction with HCl in activating alumina and alumina-platinum metal catalysts at temperatures in the range of 900 to 1500° F.

The treatment at elevated temperature with Cl and/or HCl incorporates Cl in the catalyst. After such treatment the analysis of the catalyst composite shows a chlorine content in the range of 1 to 5 percent by weight. It is preferred to incorporate an amount of chlorine in the range of 2 to 4 weight percent by this method. The treatment of the catalyst with $AlCl_3$ increases the Cl content thereof to as much as 8 percent by weight. When treating with both the chlorine-containing gas and sublimed $AlCl_3$, the total chlorine content is generally in the range of 2 to 8 weight percent and should be below about 10 weight percent.

EXAMPLE VI

Two catalysts were prepared by treating a platinum-halogen-alumina composite with $CCl_4$. Catalyst A was prepared by drying platinum-halogen-alumina (weight percent composition: 0.71 platinum; 0.5 fluorine; 0.3 chlorine; remainder alumina) in prepurified $N_2$ and then treating the catalyst with nitrogen containing $CCl_4$ for about two hours at 730° F. Catalyst B was prepared by drying platinum-halogen-alumina (weight percent composition: 0.36 platinum; 0.5 fluorine; 0.3 chlorine; remainder alumina) at 1000° F. and then treating the catalyst with nitrogen containing $CCl_4$ for about 3.2 hours at 1000 F. The nitrogen was passed through a $CCl_4$ bubbler at room temperature and probably contained about 12–15 volume percent $CCl_4$. A third catalyst, C, was prepared by drying platinum-halogen-alumina (weight percent composition: 0.36 platinum; 0.5 fluorine; 0.3 chlorine; remainder alumina) at 1000° F. in prepurified nitrogen. These catalysts gave the following results in isomerizing n-butane containing 0.03–0.04 wt. percent $CCl_4$:

|  | Catalyst | | |
| --- | --- | --- | --- |
|  | A | B | C |
| Temp., °F | 346 | 303 | 301 |
| Pressure, p.s.i.g | 500 | 500 | 500 |
| LHSV | 1.1 | 1.3 | 1.2 |
| $H_2$/HC, mol ratio | 0.62 | 0.45 | 0.5 |
| Conv., percent | 14.7 | 39.4 | None |
| Isom. efficiency, percent | 99.3 | 97.0 | 0 |

The chloride in the feed does not materially affect the isomerization in these tests. The untreated catalyst, C, failed to isomerize any n-butane.

The treating temperature, using $CCl_4$, can be lower than with the other agents such as from 700 to 900° F.

Treatment of an activated alumina catalyst or a platinum-alumina catalyst with $CCl_4$ in accordance with the invention has an effect similar to the demonstrated effect on platinum-halogen-alumina.

EXAMPLE VII

A sample of calcined platinum-alumina catalyst containing about 0.5 weight percent fluorine and 0.3 percent chlorine was treated with hydrogen bromide diluted with a minor volume proportion of nitrogen for a period of 3.3 hours at 1200° F. The catalyst was then used for isomerizing normal butane at 302° F., 500 p.s.i.g., 1 LHSV and 0.6 mole of hydrogen to each mole of hydrocarbon. The catalyst isomerized 20 percent of the butane at 99 percent efficiency.

The catalyst without this treatment is inactive for butane isomerization at 300° F.

The treatment of bauxite with hydrogen chloride or hydrogen bromide has a readily detected effect, that of removing iron and titanium therefrom. The gaseous effluent contains vaporized ferric chloride or bromide and titanium tetrachloride tetrabromide which condense from the effluent gases on cooling. It is evident from this that bauxite is purified in addition to being activated by this treatment.

The catalyst treating process of the invention, when applied to alumina-platinum metal catalysts with or without added halogen, also produces catalysts which are active in the hydrocracking of $C_{10}$ to $C_{25}$ hydrocarbons. The hydrocracking is usually conducted at temperatures above the optimum isomerization temperature and in the range of 400 to 750° F. and in admixture with hydrogen. The catalyst to be active for hydrocracking must contain a platinum metal, preferably Pt, and may contain halogen and $AlCl_3$ also. Conventional hydrocracking conditions are operative with the catalysts of the invention.

When isomerizing or hydrocracking higher boiling hydrocarbons, it is advantageous to add isobutane with the feed to reduce yields of light hydrocarbons.

EXAMPLE VIII

Catalysts were prepared by treating a platinum-halogen-alumina composite with anhydrous HCl at 900 and 1250° F. These catalysts were then used in hydrocracking cetane and the data obtained are presented in Table V below.

TABLE V

|  | Temperature of HCl treatment, °F. | | | |
| --- | --- | --- | --- | --- |
|  | 900 | | 1,250 | |
| Hydrocracking conditions: | | | | |
| Temp., °F | 504 | 398 | 448 | 498 |
| Press., p.s.i.g | 500 | 500 | 500 | 500 |
| LHSV | 1.0 | 1.0 | 1.0 | 1.0 |
| $H_2$/cetane, mol ratio | 8.0 | 8.2 | 7.9 | 7.9 |
| Product composition, wt. percent: | | | | |
| $C_1$–$C_3$ | 3.3 | 2.0 | 9.0 | 26.6 |
| $C_4$'s | 8.4 | 7.0 | 25.3 | 34.2 |
| $C_5$–400° F | 9.6 | 8.3 | 26.6 | 19.3 |
| Above 400° F | 78.7 | 82.7 | 39.1 | 19.9 |
| Total | 100.0 | 100.0 | 100.0 | 100.0 |

The catalyst treated at 1250° F. gave almost as high a conversion as the one treated at 900° F. at 100° F. lower hydrocracking temperature.

EXAMPLE IX

The hydrocracking catalyst should first be dried at about 800–1400° F. for about 0.5 to 100 hours. Heating in dry gas or a vacuum are satisfactory. The data in Table VI show how a two-hour drying at 1200° F. was better than a two-hour drying at 900° F. and how a fourteen-hour drying at 900° F. was better than a two-hour drying at 900° F. Cetane feed and Pt-halogen-alumina reforming catalyst were used.

TABLE VI

|  | Catalyst | | |
| --- | --- | --- | --- |
|  | X[1] | Y | Z |
| Drying temp., °F | 900 | 900 | 1,200 |
| Drying time, hrs. (prepurified $N_2$) | 1.8 | 14 | 2.0 |
| HCl, treating temp., °F | 900 | 900 | 900 |
| HCl, treating time, hrs. (HCl-$N_2$) | 3.5 | 3.4 | 3.1 |
| Hydrocracking temp., °F | 504 | 502 | 502 |
| Pressure, p.s.i.g | 500 | 500 | 500 |
| LHSV | 0.96 | 0.99 | 1.00 |
| $H_2$/cetane, mol ratio | 8.2 | 7.9 | 7.9 |
| Product comp., wt. percent: | | | |
| $C_1$–$C_3$ | 3.3 | | 8.6 |
| $C_4$'s | 8.4 | | 28.2 |
| $C_5$–400° F | 9.7 | | 36.7 |
| 400–500° F | } 78.6 | ≅40[2] | 1.3 |
| Above 500° F | | | 25.2 |
| Total | 100.0 |  | 100.0 |

[1] Catalyst previously used in short test isomerizing n-butane.
[2] Estimated from preliminary data.

EXAMPLE X

The catalyst should be activated at about 400–1400° F. Catalysts first dried at 1200–1250° F. in prepurified nitrogen were activated by heating in HCl-prepurified nitrogen mixture at 300–1200° F. The catalyst activated at 300° F. was much less active than the others. Cetane feed and Pt-halogen-alumina reforming catalyst were used in the runs of Table VII below.

TABLE VII

|  | Catalyst | | | |
| --- | --- | --- | --- | --- |
|  | E | F | G | H[1] |
| Drying temp., °F | 1,200 | 1,250 | 1,200 | 1,250 |
| Drying time, hrs. (prepurified $N_2$) | 2 | 1.8 | 2.0 | 2.0 |
| HCl, treating temp., °F. (HCl-$N_2$) | 300 | 600 | 900 | 1,250 |
| HCl, treating time, hrs | 3.1 | 2.9 | 3.1 | 3.7 |
| Hydrocracking temp., °F | 506 | 502 | 502 | 498 |
| Pressure, p.s.i.g | 500 | 500 | 500 | 500 |
| LHSV | 0.99 | 0.99 | 1.00 | 0.98 |
| $H_2$/cetane, mol ratio | 7.9 | 7.9 | 7.9 | 8.0 |
| Product comp., wt. percent: | | | | |
| $C_1$–$C_3$ | 0.4 | 4.9 | 8.6 | 25.1 |
| $C_4$'s | 1.1 | 27.4 | 28.2 | 32.8 |
| $C_5$–400° F | 7.6 | 45.2 | 36.7 | 21.3 |
| 400–500° F | 1.6 | 0.7 | 1.3 | } 20.8 |
| Above 500° F | 89.3 | 21.8 | 25.2 | |
| Total | 100.0 | 100.0 | 100.0 | 100.0 |

[1] Catalyst H previously used in short test isomerizing n-butane.

Although activating a catalyst by treating with HCl alone or with HCl diluted with an inert gas such as prepurified nitrogen is satisfactory, a preferred way is to treat with $H_2$-HCl mixture. Reduction of the catalyst in $H_2$ and then activation in $N_2$-HCl is also a preferred method of treatment. Data showing the effect of $H_2$ are presented in Table VIII below. Cetane feed and a starting material, eta alumina impregnated with chloroplatinic acid and dried, were used.

TABLE VIII

| | Catalyst | | |
|---|---|---|---|
| | I | J | K |
| Calcination | Air at 1,000° F | H₂ at 750° F | H₂ at 700° F. |
| Reduction time in H₂ at 700° F | None | 15 hrs. at 750° F | 0.9 hrs. at 700° F. |
| Drying time and temperature | 1.5 hrs. at 1,200° F | ~1.9 hrs. at 1,200° F | ~1.2 hrs. at 1,200° F. |
| Treating gas | N₂—HCl | N₂—HCl | H₂—HCl. |
| Treating temperature, °F | 1,200 | 1,200 | 1,200 |
| Treating time, hrs | 3.0 | 3.6 | 3.1 |
| Hydrocracking temperature, °F | 406 | 409 | 302 |
| Pressure, p.s.i.g | 500 | 500 | 500 |
| LHSV | 0.99 | 1.0 | 1.0 |
| H₂/cetane mol ratio | 8.1 | 7.7 | 7.6 |
| Product comp., wt. percent: | | | |
| $C_1$–$C_3$ | 0.9 | 3.4 | 4.4 |
| $C_4$'s | 9.7 | 31.9 | 44.3 |
| $C_5$–400° F | 30.5 | 53.3 | 51.0 |
| 400–500° F | 2.2 | 1.1 | 0.3 |
| Above 500° F | 56.7 | 10.3 | 0.0 |
| Total | 100.0 | 100.0 | 100.0 |

EXAMPLE XI

Recent work shows that drying platinum-alumina catalyst at 1200° F. and then treating with HCl at 600° F. or 900° F. does not give as active catalysts for isomerizing normal butane as were prepared previously by both drying and HCl-treating at temperatures above 900° F.

Catalyst L was prepared by first heating a platinum on active alumina composite (0.7 weight percent platinum, 0.3 percent chlorine, 0.5 percent fluorine) at 700° F. for 1 hour in prepurified nitrogen, heating to 1200° F. over a period of 0.6 hour, and holding at 1200° F. for 2 hours. Then a mixture of anhydrous HCl and N₂ was passed over the catalyst for 3.25 hours at 600° F. Catalyst M was prepared in a similar manner except that the HCl-treatment was at 900° F. These catalysts were then tested in the isomerization of normal butane.

TABLE IX

| | Catalyst | |
|---|---|---|
| | L | M |
| Temperature, °F | 300 | 304 |
| Pressure, p.s.i.g | 500 | 500 |
| LHSV | 1.3 | 1.00 |
| H₂/HC, mol ratio | 0.4 | 0.5 |
| n-Butane conv., percent | 0.1 | 3.5 |
| Isom. efficiency, mol percent | 100.0 | 74.3 |

EXAMPLE XII

Catalyst N was prepared by first heating a platinum on eta alumina composite (approximately 0.5 percent platinum) to 700° F. over a period of 0.7 hour in hydrogen, holding at 700° F. for 1.1 hours, heating to 1200° F. over a period of about 0.6 hour, and holding at 1200° F. for 1.6 hours. Then a mixture of hydrogen and anhydrous HCl was passed over the catalyst for 3.1 hours at 1200° F. This catalyst gave high isomerization of normal heptane at 301° F.

Table X

| Catalyst | N |
|---|---|
| Temperature, °F | 301 |
| Pressure, p.s.i.g | 100 |
| LHSV | 0.8 |
| H₂/HC mol ratio | 4.1 |
| n-Heptane conversion, percent | 59.2 |
| Isomerization efficiency, mol percent | 77.4 |

EXAMPLE XIII

Catalysts of the invention are also active in hydrocracking naphthenes. Catalyst O was prepared using platinum on eta alumina composite. This composite was heated in hydrogen to 700° F. and maintained at 700° F. for about 1 hour. Then it was heated to 1200° F. and held at 1200° F. for about 1.6 hours. After this heating anhydrous HCl was started with the hydrogen and was continued for 3.1 hours. This catalyst was then used to hydrocrack the naphthenic hydrocarbon Decalin. Data from the run are presented in Table XI.

Table XI

| Process Conditions | |
|---|---|
| Length of run, hr. | 3 |
| Temperature, °F. | 401 |
| Pressure, p.s.i.g. | 500 |
| H₂/HC, mol ratio | 7.8 |
| LHSV | 1.0 |
| Products, weight percent | |
| $C_1$–$C_3$ | 0.5 |
| $C_4$'s | 9.7 |
| $C_5$–200° F. | 18.1 |
| 200–350° F. | 46.7 |
| 350–369 °F. | 15.0 |
| Above–368° F. | 10.0 |
| Total | 100.0 |

Certain modifications of the invention will become apparent to those skilled in the art and the illustrative details disclosed are not to be construed as imposing unnecessary limitations on the invention.

I claim:
1. A process for activating a catalyst which comprises heating active alumina, substantially free of platinum and other metals, at a temperature in the range of 400 to 1500° F. in a dry ambient for a period in the range of 0.5 to 100 hours, at least 0.5 hour being in the range of 900 to 1500° F. in an ambient including a substantial and activating concentration of at least one gas selected from the group consisting of anhydrous HCl, Cl₂, HBr, Br₂, and the Cl and Br derivatives of methane.

2. The process of claim 1 using HCl as the activating gas.

3. The process of claim 1 using CCl₄ as the activating gas.

4. A process for activating a catalyst consisting essentially of active alumina which comprises heating an active alumina at a temperature in the range of 1050 to 1400° F. in a dry ambient including a substantial and activating concentration of at least one gas selected from the group consisting of anhydrous HCl, Cl₂, HBr, Br₂, and the chlorine and bromine derivatives of methane for a period of at least 0.5 hour.

5. A process for activating a catalyst consisting essentially of activated alumina which comprises the steps of:
   (a) heating said alumina at a temperature in the range of 900 to 1500° F. for a period of at least 0.5 hour in a dry relatively inert ambient; and
   (b) thereafter, contacting the dried alumina with at least one activating gas selected from the group consisting of anhydrous HCl, Cl₂, HBr, Br₂ and the Cl and Br derivatives of methane at a temperature of at least 400° F. and below the range of (a) for at least 0.5 hour.

6. The process of claim 5 wherein the activating gas comprises HCl.

7. The process of claim 5 wherein the activating gas comprises $CCl_4$.

8. The process of claim 5 including the step of:
(c) further activating the catalyst composite after step (b) by subliming $AlCl_3$ onto same at a temperature in the range of 375 to 660° F. so as to incorporate in said composite an amount of Cl in the range of 2 to 8 weight percent based upon the alumina.

9. The process of claim 8 wherein the activating gas is HCl and including the step of:
(d) further treating the composite resulting from step (c) by heating same to a temperature in the range of 900 to 1500° F. for a period in the range of 0.5 to 100 hours.

10. A process for activating a catalyst comprising principally active alumina having deposited therein a minor but effective amount of platinum metal which comprises (a) heating said catalyst in a dry ambient for a period in the range of 0.5 to 100 hours at a temperature in the range of 900 to 1500° F. and (b) contacting said catalyst with at least one member of the group consisting of anhydrous HCl, $Cl_2$, HBr, and $Br_2$, and the Cl and Br derivatives of methane as the essential activating gas at a temperature in the range of 900° to 1500° F. for at least 0.5 hour.

11. The process of claim 10 wherein said heating and activation temperatures are in the range of 1050–1400° F.

12. The process of claim 11 wherein said activating gas is carbon tetrachloride.

13. The process of claim 10 wherein said heating step (a) and said contacting step (b) are performed simultaneously.

References Cited

UNITED STATES PATENTS 2,880,168   3/1959   Feller _____ 208—140

DELBERT E. GANTZ, *Primary Examiner.*

U.S. Cl. X.R.

252—442; 260—683.68, 683.7